Jan. 3, 1933.  E. G. BAYER  1,893,388
THERMOMETER
Filed Aug. 30, 1930    2 Sheets-Sheet 2
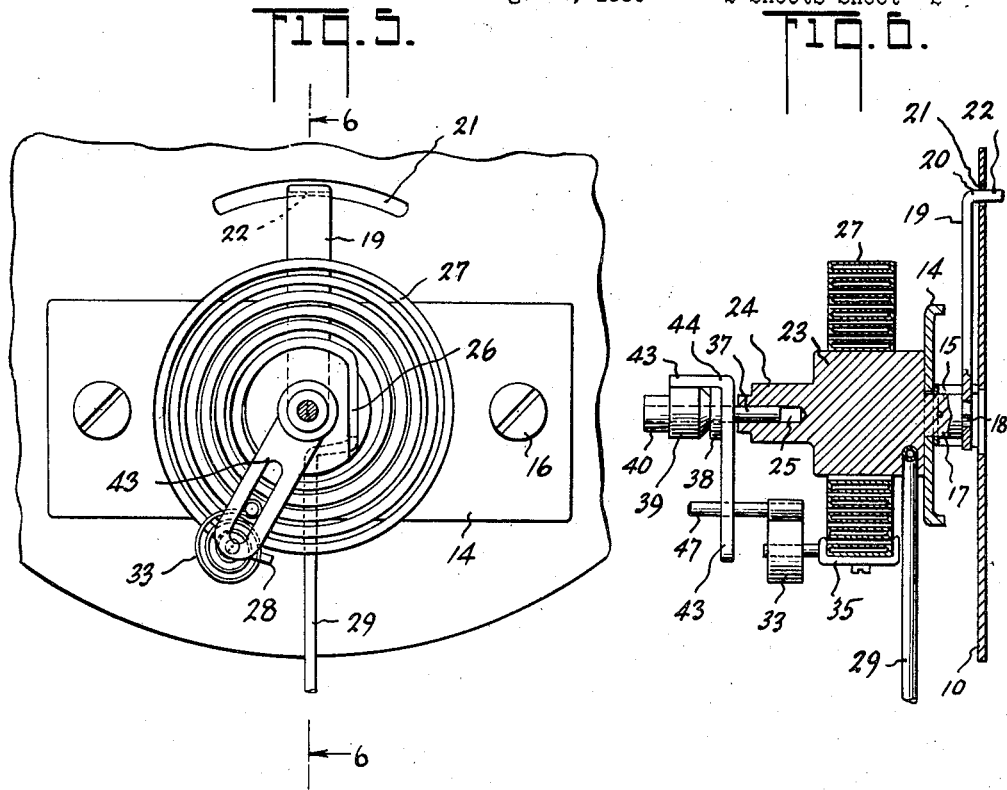
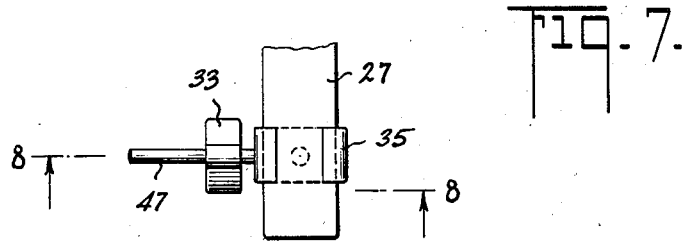
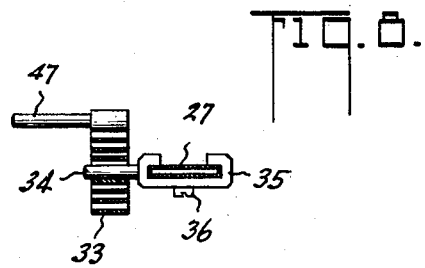
ERNEST G. BAYER
INVENTOR Patented Jan. 3, 1933

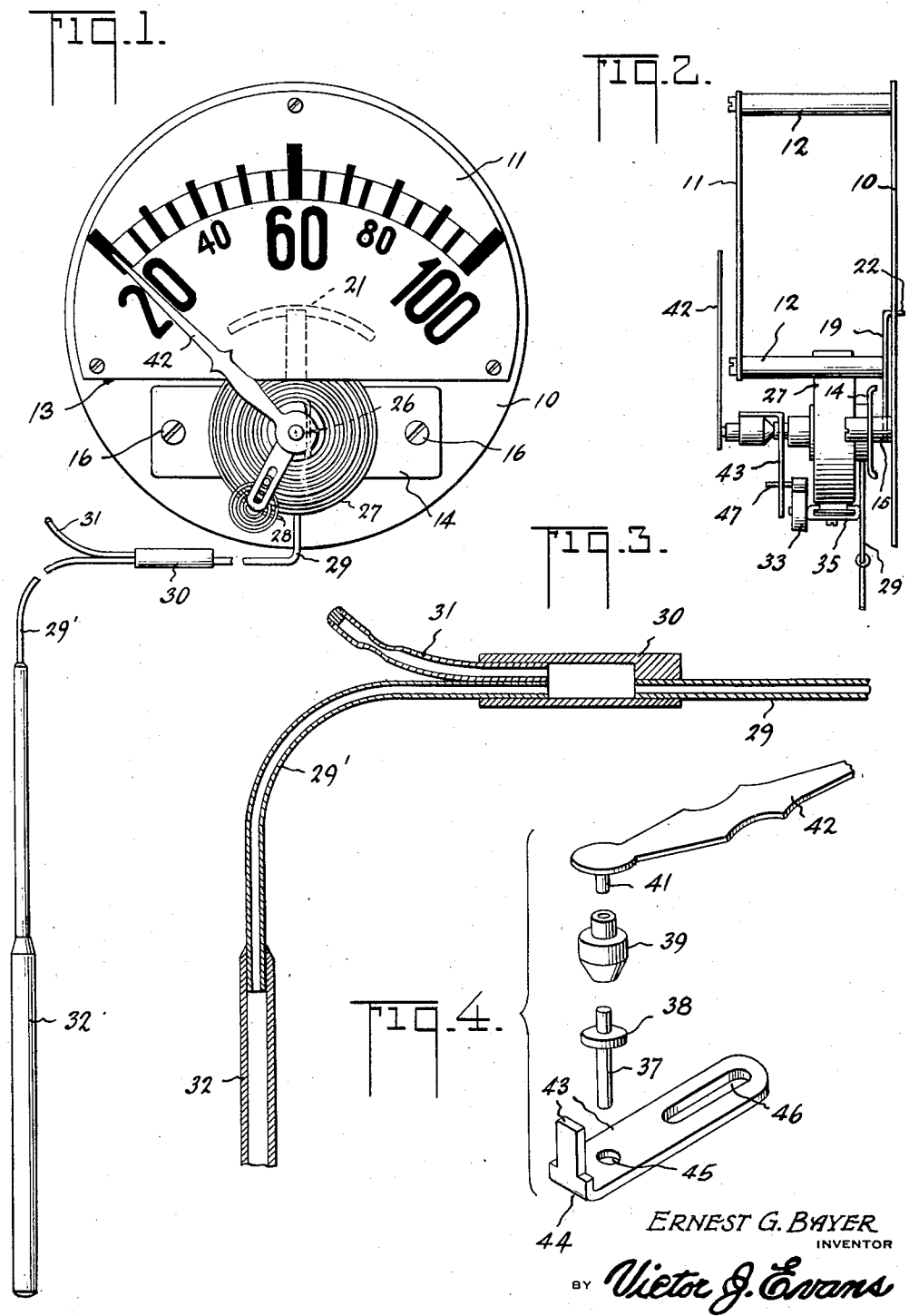

1,893,388

UNITED STATES PATENT OFFICE

ERNEST GUSTAVE BAYER, OF MIDDLE VILLAGE, LONG ISLAND, NEW YORK

THERMOMETER

Application filed August 30, 1930. Serial No. 478,964.

This invention relates to indicator instruments in general, and more particularly to pressure or temperature responsive instruments adapted for indicating pressures, vacuums, temperatures and the like.

The prime object of this invention is to provide an instrument of this kind in which a compensating element is employed for counteracting deviations of the instrument due to atmospheric temperature and other influences to which the instrument itself, or the leads to such instrument, are subjected.

Another object of this invention is to provide a compensating element for an indicator instrument mounted in such a way as to render it adjustable relative to the main actuating element of such instrument so as to enable an adjustment of the indicator, taking in consideration the various external conditions in which the instrument operates.

A still further object of this invention is to provide in such instrument a main actuating element so arranged as to be bodily adjustable relative to the casing or indicator scale of the instrument, thereby facilitating the positioning of the indicator arm or pointer relative to the scale.

A still further object of my invention is to provide in such instrument an operative connection between the main actuating element thereof and the compensating element associated with the latter, and to equip such operative connection with an adjustable indicator arm or pointer which may be set irrespective of the main actuating element and the compensating element in a desired position relative to the indicator scale.

Indicator instruments for measuring pressure, vacuum, temperature and the like are usually equipped with pointer adjustment means to facilitate the setting of the pointers to a starting position, taking in consideration atmospheric pressure or room temperature, and from then on the indications of the pointers are read. In a great many instances, however, the lead from the subject, whose pressure or temperature is to be measured, to the instrument itself, passes over long distances and is subjected to various influences such as atmospheric pressure, outside temperatures, etc., and therefore the readings at the indicator scale are considerably affected and become inaccurate.

For such inaccuracies, a compensating factor is usually employed in final calculations of the measurements taken, but very often such factor in itself is inaccurate and does not really correct the readings taken; in fact, may make them still more inaccurate.

A compensating element connected with the main actuating element, automatically causes a correction of the readings, since it is actually subjected to existing external influences, and if properly designed, will result in so correcting the readings as to be exact.

Other objects and advantages of the invention will be hereinafter specifically pointed out, or will become apparent, as the specification proceeds.

With the above indicated objects in view, the invention resides in certain novel constructions and combinations and arrangement of parts, clearly described in the following specification and fully illustrated in the accompanying drawings, which latter show embodiments of the invention as at present preferred.

In the drawings:

Fig. 1 illustrates a temperature indicator, equipped with a pressure-type actuating element;

Fig. 2 is a side elevation thereof;

Fig. 3 illustrates an enlarged detail cross sectional view through a portion of a lead-in to the instrument;

Fig. 4 illustrates perspective views of the various parts connecting the main actuating member with the compensating element and the indicator or pointer;

Fig. 5 is an enlarged detail view of the arrangement of the main actuating element and compensating element as arranged in my device;

Fig. 6 is a cross sectional view taken on line 6—6 of Fig. 5; and

Figs. 7 and 8 are detail views illustrating the attachment of the compensating element to the main actuating element.

Referring now specifically to the figures, numeral 10 denotes the back supporting member of an indicator to which is attached a dial or indicator scale 11 by means of posts 12. The dial is cut off at its lower portion at 13, so as to permit the operating mechanism of the instrument to be readily accessible.

Attached also to member 10, there will be seen a longitudinal plate or support 14, spaced from member 10 by collars 15 secured in position by means of screws 16. In support 14 is rotatably lodged the reduced end portion of a shaft 17 provided with a square end 18 engaged by adjusting lever 19 protruding at 20 through the back member 10, in which a slot 21 is provided for permitting handle 22 of lever 19 to swing in either direction. Shaft 17 is provided with an enlargement 23 which again is reduced at 24. The reduced extension 24 is provided with a socket 25, the purpose of which will be explained presently.

In enlargement 23 there is secured at 26 the inner end of a hollow spiral spring member or main actuating element 27, which in this case is a Bourdon spring having an outer end 28. Connected with the inner end 26 of the Bourdon spring, there will be observed a tubing 29 provided at 30 with a filling chamber, from which extends an exhaust and filling pipe 31 and an extension 29' leading to a bulb or cylinder 32 adapted to be placed wherever temperature is to be measured.

Tubes 29 and 29' are adapted to be filled after forming a vacuum therein, with an expanding liquid which not only completely fills the tubes 29 and 29', but also the Bourdon spring.

Near the outer end 28 of the Bourdon spring, there will be seen provided a compensating element 33 which consists of a bi-metal thermostatic spring coiled to a spiral similar in form to that of the Bourdon spring. This compensating element is secured at its inner end to a pin 34 extending from an adjustable bracket or clamp 35 adapted to engage the outer end of Bourdon spring 27, as clearly illustrated in Figs. 7 and 8. Clamp 35 is preferably equipped with a set screw 36 adapted to secure clamp 35 in proper relation relative to Bourdon spring 27.

Journaled in socket 25 of extension 24 of the shaft, there will be seen a pin member 37 provided with a collar 38 against which bears a conical member 39 having a reduced extension 40. Member 39 is provided with a through-hole adapted to receive the outer portion of pin 37 extending beyond collar 38 and pin 41 of indicator or pointer 42.

Secured to conical member 39, at its side, there will be observed an operating arm 43 which is bent at 44 and provided with an opening 45 adapted to receive the inner end of pin 37. This operating lever is provided with a slot 46 adapted to receive and co-operate with a pin 47 arranged at the outer end of compensating element 33.

*Operation*

Pointer 42 may be adjusted relative to the scale of the instrument in various manners. Firstly, the entire Bourdon spring may be moved bodily and adjusted by means of lever 19 and its handle 22 secured to shaft 23. Since pointer 42 is in frictional engagement with conical member 39, any movement of operating arm 43 will cause a movement of pointer 42. Therefore, when compensating element 33 is moved relative to the Bourdon spring, pointer 42 also is caused to move, and finally, the pointer itself may be moved relative to member 39 since it is in frictional engagement therewith.

When bulb 32 of tubing 29 is subjected to heat, the liquid therein expands and causes Bourdon spring 27 to, so to speak, uncoil so that its outer end changes its position and takes with it operating arm 43 which transmits its motion to indicator 42.

Assume that the instrument and tubing 29 are placed in a room which is cooler than the place in which bulb 32 is located, the cooling effect upon the instrument and tubing 29 would ordinarily cause an inadequate expansion of the Bourdon spring, resulting in a false reading upon the dial.

Due to the compensating element 33 provided at the end of the Bourdon spring, the incorrect reading is corrected in that the thermostatic element will uncoil itself so that its outer end with its pin 47 will cause operating lever 43 to move in the general direction in which it is operated by the Bourdon spring. This motion is transmitted and added to the motion imposed by the Bourdon spring upon the indicator, and thus a correct reading may be taken.

If, on the other hand, the instrument and the tubing 29 is exposed to greater heat than normal temperature, the Bourdon spring will naturally uncoil itself more than it actually should, and therefore will cause indicator 42 to move a few degrees beyond the point corresponding to the temperature of bulb 32. Again the compensating element counteracts the too great expansion of the Bourdon spring in that thermostatic element coils itself so that its end provided with pin 47 moves in clockwise direction, and thereby takes with it operating lever 43 and against the movement imparted thereto by the Bourdon spring. In this way, pointer 42 is caused to assume its correct position relative to the scale.

In order to facilitate a proper adjustment of the instrument for various conditions of temperature and barometric pressure, compensating element 33 necessarily has to be adjustable relative to the outer end of the Bourdon spring, and for this purpose clamp 35 with set screw 36 is provided, so that the element may be moved gradually until its proper position is found for the existing conditions.

Slight corrections of the position of indicator 42 may be made by operating the entire main actuating mechanism, that is, the Bourdon spring, by means of lever 19 and its handle 22.

A still further adjustment of indicator 42 is facilitated by its frictional engagement with conical member 39.

The adjustability of the compensating element relative to the Bourdon spring is of further importance, as such adjustment facilitates the control of the range of the instrument.

Each instrument is calculated for a certain expansion of the volume of liquid within the Bourdon spring, the bulb and the tubing. A slight inaccuracy in the construction, arrangements or volumes of any one of the three members or of the properties of the liquid will cause a deviation in the operation of the instrument, causing a change of its operating range, so that the pointer may travel beyond, or short of the outer limits of the scale.

Such deviations must be corrected and adjustments are made possible by the proper setting of the compensating element relative to the Bourdon spring. Prior to final adjustment of the instrument as to its operating range, the compensating element is moved in the direction from the outer spring end inwards, thereby limiting the movement of the indicator, until its proper operating range is found.

On the other hand when the indicator arm, before adjustment of the instrument, travels short of the outer scale limits, the compensating element is moved towards the outer end of the Bourdon spring until the proper range is found.

Due to the fact that the degree of the movement of the Bourdon spring gradually decreases in the direction from its outer end inwards, the adjustability of the compensating element relative to the spring affords a very minute setting of the instrument, thereby increasing its accuracy over existing devices to a considerable extent.

The above description deals with a thermometric instrument and its special construction shows the employment of a Bourdon spring.

I therefore shall not be limited to the employment of my invention in connection with a thermometer only.

The hereinabove described construction admits of considerable modification without departing from the invention; therefore, it is my wish not to be limited to the precise arrangements shown and described, which are, as aforesaid, by way of illlustration merely.

In other words, the scope of protection contemplated is to be taken solely from the appended claims, interpreted as broadly as is consistent with the prior art.

I claim:

1. In an indicator instrument, the combination with a multiply convoluted Bourdon spring supported at its inner end, of a thermostatic compensating element adjustably secured to the other end, an indicator supported centrally relative to said spring, and means for operatively connecting said indicator with said element.

2. In an indicator instrument, the combination with a multiply convoluted Bourdon spring, of a revolubly-mounted axially socketed support whereon said spring is fixedly mounted at its inner end, a thermostatic compensating element adjustably connected to the free end of said spring, an operating arm, an indicator, means whereby said arm and indicator are pivotally supported in the socket of the support and adapted to turn in unison, and means whereby said operating arm is controllably connected with said compensating element so that the indicator is caused to follow the movement of the operating arm as controlled by both the spring and said element.

3. In an indicator instrument, the combination with an indicator scale, of an indicator operating mechanism comprising a supporting member, a shaft rotatably mounted therein, an adjusting arm connected with the shaft, a spiral Bourdon spring secured at its inner end to the shaft, a thermostatic element adjustably mounted on the free end of the spring and provided with a motion transmitting member, an operating arm having an operative connection with said motion transmitting member, an indicator and means whereby said indicator is revolubly carried by said shaft and disposed over said scale, said indicator means being operatively connected with said operating arm.

4. In an indicator instrument, as set forth in claim 3, said thermostatic element comprising a thermostatic metal spring, and a carrier supporting said spring at its center and provided with means for fastening it, after adjustment, to the free end of the Bourdon spring.

5. In an indicator instrument, the combination with a scale supporting frame, of an indicator scale secured thereto, an indicator operating mechanism disposed in operative relation to said scale, and comprising a supporting member, a shaft extending therefrom and rotatably mounted therein, an adjusting arm connected with said shaft and adapted to control its turning, a pressure-responsive element in the form of a spiral spring secured at its inner end to said shaft, a thermostatic compensating element adjustably connected to the outer free end of said pressure-responsive spring and comprising a spiral of thermostatic metals, a clamp supporting the inner end of the thermostatic spiral and mounted upon, and adjustable relative to the free end of said spring, an engaging member provided at the free end of the thermostatic spiral, an operating arm operatively connected with said engaging member, a pointer means whereby said pointer is mounted to turn about an axis concentric with that of the shaft extending from the support and whereby the pointer has adjustable frictional engagement with the operating arm, said pointer extending towards said scale, said adjusting arm of said shaft adapted to facilitate positioning of the latter, and thereby of said indicator relative to said scale, said compensating element adapted to govern the movement imposed upon the indicator by said pressure-responsive element.

In testimony whereof I hereby affix my signature.

ERNEST GUSTAVE BAYER.